(12) United States Patent
Furusako et al.

(10) Patent No.: US 10,603,713 B2
(45) Date of Patent: Mar. 31, 2020

(54) MECHANICAL JOINING APPARATUS AND MECHANICAL JOINING METHOD

(71) Applicant: NIPPON STEEL & SUMITOMO METAL CORPORATION, Tokyo (JP)

(72) Inventors: Seiji Furusako, Tokyo (JP); Tohru Okada, Tokyo (JP); Yasunobu Miyazaki, Tokyo (JP); Fuminori Watanabe, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 165 days.

(21) Appl. No.: 15/741,058

(22) PCT Filed: Jul. 1, 2016

(86) PCT No.: PCT/JP2016/069719
§ 371 (c)(1),
(2) Date: Dec. 29, 2017

(87) PCT Pub. No.: WO2017/002976
PCT Pub. Date: Jan. 5, 2017

(65) Prior Publication Data
US 2018/0185903 A1 Jul. 5, 2018

(30) Foreign Application Priority Data
Jul. 1, 2015 (JP) .................................. 2015-133110

(51) Int. Cl.
*B23P 11/00* (2006.01)
*B21J 15/02* (2006.01)
(Continued)

(52) U.S. Cl.
CPC ............. *B21J 15/025* (2013.01); *B21J 15/08* (2013.01); *B21J 15/28* (2013.01); *B21J 15/36* (2013.01); *F16B 5/04* (2013.01)

(58) Field of Classification Search
CPC . B21J 15/025; B21J 15/36; B21J 15/28; B21J 15/08; B21J 15/046; B21J 15/048; F16B 5/04
See application file for complete search history.

(56) References Cited

U.S. PATENT DOCUMENTS 6,417,490 B1 * 7/2002 Liebrecht ............... B21J 15/025
219/150 V
2003/0167621 A1 * 9/2003 Wang ..................... B21J 15/025
29/525.06
(Continued)

FOREIGN PATENT DOCUMENTS

CN 101716644 A 6/2010
CN 101890564 A 11/2010
(Continued)

OTHER PUBLICATIONS

Ferrum, "Joining of Sheets by Self Piercing Rivet and Mechanical Clinch," vol. 16, No. 9, 2011, pp. 32-38.
(Continued)

*Primary Examiner* — Jun S Yoo
(74) *Attorney, Agent, or Firm* — Birch, Stewart, Kolasch & Birch, LLP (57) ABSTRACT

Provided is a mechanical joining apparatus enabling reduction of breakage of the area around a rivet of a joint obtained by riveting, the apparatus comprising a punch and die, blank holder, first power device, second power device and cooling device, wherein the first power device is configured to start supply of current through the holder and die so as to raise the temperature of the sheets before the punch drives in the rivet, the second power device is configured to start supply (Continued)

of current through the punch and die so as to supply current through and heat treat the rivet after the punch drives in the rivet, and the cooling device is connected to the punch and is configured to cool the rivet after the rivet is heat treated.

5 Claims, 2 Drawing Sheets

(51) Int. Cl.
*B21J 15/08* (2006.01)
*B21J 15/36* (2006.01)
*B21J 15/28* (2006.01)
*F16B 5/04* (2006.01)

(56) References Cited

U.S. PATENT DOCUMENTS

| | | | | |
|---|---|---|---|---|
| 2004/0148760 | A1* | 8/2004 | Wang | B21J 15/025 29/525.06 |
| 2005/0161965 | A1* | 7/2005 | Eberlein | B21J 15/025 296/29 |
| 2010/0018027 | A1* | 1/2010 | Stevenson | B21J 15/025 29/525.06 |
| 2010/0083481 | A1* | 4/2010 | Luo | B21J 15/025 29/432 |

FOREIGN PATENT DOCUMENTS

| | | |
|---|---|---|
| CN | 101920302 A | 12/2010 |
| CN | 103600017 A | 2/2014 |
| DE | 198 52 809 A1 | 5/1999 |
| JP | 11-33664 A | 2/1999 |
| JP | 2000-202563 A | 7/2000 |
| JP | 2004-516140 A | 6/2004 |
| JP | 2007-521964 A | 8/2007 |
| JP | 2007-254775 A | 10/2007 |
| JP | 2010-188383 A | 9/2010 |
| WO | WO 2014/196268 A1 | 12/2014 |

OTHER PUBLICATIONS

Chinese Office Action with English translation dated Aug. 22, 2018, issued in corresponding Chinese Patent Application No. 201680028974. 8.

* cited by examiner

FIG. 1

MECHANICAL JOINING APPARATUS AND MECHANICAL JOINING METHOD

TECHNICAL FIELD

The present disclosure relates to a mechanical joining apparatus, more particularly relates to a mechanical joining apparatus for joining a plurality of metal sheets including one or more high strength steel sheets with a tensile strength of 780 MPa or more.

BACKGROUND ART

In recent years, in the automotive field, to lower fuel consumption and cut the amount of emission of $CO_2$, it has been demanded to make the car bodies lighter in weight while improving impact safety by making the car body members high in strength. To meet these demands, it is effective to use high strength steel sheet for the car bodies and parts. For this reason, demand for high strength steel sheet has been rising. To use high strength steel sheet for car bodies or parts etc., the high strength steel sheet has to be joined with other metal sheets, but there are the following such problems in joining them.

In the past, car bodies have been assembled and parts attached etc. mainly by spot welding. Spot welding has been employed even when joining a plurality of metal sheets including high strength steel sheets. In a joint formed by superposing a plurality of metal sheets and spot welding them in this way, the tensile strength is an important characteristic. As the tensile strength, there are a tensile shear strength (TSS) measured by applying a tensile load in the shear direction and a cross tensile strength (CTS) measured by applying a tensile load in the peeling direction.

A spot welded joint formed from a plurality of steel sheets having a 270 to 600 MPa tensile strength increases in CTS along with an increase in strength of the steel sheets. Therefore, in a spot welded joint formed by steel sheets having a 270 to 600 MPa tensile strength, problems relating to joint strength seldom occur. However, in a spot welded joint formed by a plurality of metal sheets including one or more steel sheets having a 780 MPa or more tensile strength, even if the steel sheets increase in tensile strength, the CTS does not increase or else decreases. This is because due to the drop in deformation ability, more stress concentrates at the weld zones, due to inclusion of large amounts of alloy elements, the weld zones are hardened, and due to segregation by solidification, the weld zones fall in toughness.

However, in a spot welded joint formed by a plurality of metal sheets including one or more steel sheets having a 780 MPa or more tensile strength, even if the steel sheets increase in tensile strength, the CTS does not increase or else decreases. This is because due to the drop in deformation ability, more stress concentrates at the weld zones, due to inclusion of large amounts of alloy elements, the weld zones are hardened, and due to segregation by solidification, the weld zones fall in toughness.

For this reason, in joining a plurality of metal sheets including one or more steel sheets having a 780 MPa or more tensile strength, art for improving the CTS has been sought. As one of the arts for solving this problem, there is the art of mechanical joining members without causing the matrix material to melt. Specifically, there is the art of stacking members to be joined such as a plurality of metal sheets, holding down the outer circumference of the punch by a blank holder preventing the metal sheets from springing up while driving in a rivet by the punch, and thereby mechanically joining the plurality of metal sheets with each other by the rivet.

However, in this art, there were the problem that since a rivet is driven in, the die side steel sheet deforms by an extremely great amount and, due to insufficient ductility or localization of deformation, the die side steel sheet fractures, the problem that when a tensile stress is applied in the shear direction and peel direction, the rivet will pull out and break and sufficient values of tensile strength in the shear direction and peel direction cannot be obtained, and the problem that there is almost no difference from the same rivet driving type of high strength steel sheet joints and mild steel sheet joints when comparing the fatigue strengths of the two.

As art for solving such problems, PLT 1 discloses the art of joining stacked high strength steel sheets with tensile strengths of 430 to 1000 MPa by driving a rivet through them and deforming the emerging front end of the rivet to thereby mechanically join the sheets and obtain a high strength steel sheet excellent in tensile properties and fatigue properties.

The art disclosed in PLT 1 is effective as art when joining a plurality of steel sheets and covers high strength steel sheet with a tensile strength of up to 619 MPa in its study. However, in PLT 1, application of the above art to a plurality of steel sheets including high strength steel sheets with a tensile strength of 780 MPa or more was not studied.

Further, NPLT 1 describes that when joining high strength steel sheet and aluminum alloy sheet by driving in a rivet to mechanically join them, joining them without defect is possible up to a plurality of metal sheets including high strength steel sheet with a tensile strength of 590 MPa or so, but with a plurality of metal sheets including high strength steel sheet with a tensile strength of 980 MPa, the rivet cannot pierce through the high strength steel sheet.

In this way, in the art of driving a rivet into metal sheets to mechanically join them, usually a hole is not drilled into the members to be joined before joining them but the rivet itself is used to pierce through the members to be joined, so it was considered difficult to drive a rivet through a plurality of metal sheets including one or more steel sheets with a high strength, for example, steel sheets with a 780 MPa or more tensile strength, to mechanically join them.

As opposed to this, PLT 2 discloses a mechanical joining method joining thin-gauge sheets having high strength or work hardened to a high degree using a rivet wherein at the start of the joining process or right before it, a blank holder and die or components arranged next to the blank holder and die or components arranged in front of them are used to heat the thin gauge sheets restricted in location and time by electrical resistance heating.

CITATION LIST

Patent Literature

PLT 1: Japanese Patent Publication No. 2000-202563A
PLT 2. Japanese Patent Publication No. 2004-516140A
PLT 3. Japanese Patent Publication No. 2007-254775A Nonpatent Literature NPLT 1: Ferrum, Vol. 16 (2011), No. 9, p. 32-38

SUMMARY OF THE INVENTION

Problems to be Solved by the Invention

PLT 2 is considered art able to be applied to steel sheet having a high strength or work hardened to a high extent.

However, when using the art disclosed in PLT 2 to actually join together by a rivet a plurality of metal sheets including one or more high strength steel sheets with a tensile strength of 780 MPa or more and testing the obtained joint by a joint strength test, sometimes the area around a rivet broke.

The present disclosure, in view of the current state of the prior art described above, has as its object the provision of a mechanical joining apparatus enabling reduction of breakage of the area around a rivet of an obtained joint even when riveting together a plurality of metal sheets including one or more high strength steel sheets with a large tensile strength.

Means for Solving the Problems

Therefore, the inventors studied intensively methods for solving the above problems. They discovered that if joining a stacked plurality of metal sheets including at least one steel sheet having a 780 MPa or more tensile strength (below, also referred to as "high strength steel sheet") (below, also referred to as a "set of sheets") and a general use rivet not high in strength, the stress concentrates in the low strength rivet and the rivet and area around it breaks.

Therefore, the inventors studied means for raising the strength of a rivet. As a result, they discovered that by making the punch and the die for driving in the rivet from electrode materials and supplying current to the rivet to electrically heat it after driving it into the set of sheets, the rivet becomes higher in strength and breakage of the area around a rivet is reduced.

The mechanical joining apparatus and mechanical joining method of the present disclosure were made based on the above discovery and have as their gists the following:

(1) A mechanical joining apparatus using a punch to drive a rivet into a plurality of metal sheets, the mechanical joining apparatus comprising
  a punch and die,
  a blank holder,
  a first power device,
  a second power device, and
  a cooling device, wherein
  the punch and die are arranged facing each other so as to enable the punch and die to sandwich a superposed plurality of metal sheets between the punch and die,
  the blank holder is a tubular member inside of which the punch can be inserted and is configured by an electrode material able to push against the plurality of metal sheets and able to electrically heat the plurality of metal sheets by one end of the blank holder being made to contact a punch side metal sheet of the plurality of metal sheets,
  the punch is comprised of a material able to drive in a rivet and able to electrically heat the rivet,
  the die is comprised of an electrode material able to support the plurality of metal sheets and able to electrically heat the rivet,
  the first power device is configured to start supply of current through the blank holder and the die so as to raise the temperature of the plurality of metal sheets before the punch drives in the rivet,
  the second power device is configured to start supply of current through the punch and the die so as to supply current through and heat treat the rivet after the punch drives in the rivet, and
  the cooling device is connected to the punch and is configured to cool the rivet after the rivet is heat treated.

(2) The mechanical joining apparatus according to (1), wherein the cooling device is configured to cool the rivet in a period from the start of the driving in of the rivet to the end of the driving in of the rivet.

(3) The mechanical joining apparatus according to (1) or (2), wherein in the die, at least a part facing the rivet across the plurality of metal sheets is made of tool steel and a part at the outer circumference of the tool steel is made of copper or copper alloy.

(4) A mechanical joining method using a punch to drive a rivet into a plurality of metal sheets, the mechanical joining method comprising
  preparing a plurality of metal sheets,
  placing the plurality of metal sheets stacked between a punch and die arranged facing each other,
  pushing one end of a blank holder comprised of a tubular member inside of which the punch can be inserted against a punch side metal sheet of the plurality of metal sheets,
  using the punch to drive a rivet into the plurality of metal sheets held by the blank holder,
  electrically heating the plurality of metal sheets through the blank holder and the die so as to raise the temperature of the plurality of metal sheets before driving in the rivet, and
  electrically heating the rivet through the punch and the die after using the punch to drive in the rivet, then cooling the rivet.

(5) The mechanical joining method according to (4), further comprising cooling the rivet through the punch in a period from the start of the driving in of the rivet until the end of the driving in of the rivet.

(6) The mechanical joining method according to (4) or (5), wherein in the die, at least a part facing the rivet across the plurality of metal sheets is made of tool steel and a part at the outer circumferences of the tool steel is made of copper or copper alloy.

Effect of the Invention

According to the mechanical joining apparatus and mechanical joining method of the present disclosure, after a rivet is driven into a plurality of metal sheets, the rivet is heat treated and becomes high in strength, so breakage of the area around a rivet in the joint can be reduced.

BRIEF DESCRIPTION OF THE DRAWINGS

FIGS. 1A to 1B are cross-sectional schematic views showing modes of mechanical joining.

FIGS. 2A and 2B are cross-sectional schematic views showing modes of mechanical joining in the case of using tool steel for part of the die.

DESCRIPTION OF EMBODIMENTS

The inventors investigated the breakage occurring in the area around a rivet in a test of the joint strength of a joint obtained by riveting. As a result, they discovered that breakage in the area around a rivet occurs when joining a set of sheets including a high strength steel sheet and a general use rivet not high in strength. This was believed due to stress concentrating at the low strength rivet and the joint obtained by the riveting breaking.

Therefore, the inventors studied means for raising the strength of a rivet. As a method for raising the strength of a rivet, the art of adjusting the chemical composition or hardening or otherwise heat treating the rivet has been known (PLT 3). However, in this art, there were the problems that the chemical composition of the rivet was restricted and a heat treatment furnace became required for heat treatment so the cost was made to rise and, further, a heat treatment process in the heat treatment furnace became necessary and an increase in the production time of the rivet was invited.

For this reason, the inventors studied means for realizing heat treatment of a rivet by a mechanical joining apparatus without using a heat treatment furnace whereupon they came up with the idea of forming the punch and die for driving in the rivet by an electrode material and supplying current to the rivet after driving it into a set of sheets to electrically heat it and thereby heat treat the rivet. That is, they came up with the idea of heating a general use rivet made of a steel material to a temperature of the austenite region, then cooling it obtain a martensite structure and thereby make the rivet high in strength.

The present disclosure covers a mechanical joining apparatus using a punch to drive a rivet into a plurality of metal sheets, the mechanical joining apparatus comprising
  a punch and die,
  a blank holder,
  a first power device,
  a second power device, and
  a cooling device, wherein
  the punch and die are arranged facing each other so as to enable the punch and die to sandwich a superposed plurality of metal sheets between the punch and die,
  the blank holder is a tubular member inside of which the punch can be inserted and is configured by an electrode material able to push against the plurality of metal sheets and able to electrically heat the plurality of metal sheets by one end of the blank holder being made to contact a punch side metal sheet of the plurality of metal sheets,
  the punch is comprised of a material able to drive in a rivet and able to electrically heat the rivet,
  the die is comprised of an electrode material able to support the plurality of metal sheets and able to electrically heat the rivet,
  the first power device is configured to start supply of current through the blank holder and the die so as to raise the temperature of the plurality of metal sheets before the punch drives in the rivet,
  the second power device is configured to start supply of current through the punch and the die so as to supply current through and heat treat the rivet after the punch drives in the rivet, and
  the cooling device is connected to the punch and is configured to cool the rivet after the rivet is heat treated.

Below, while referring to the figures, the mechanical joining apparatus of the present disclosure (below, also referred to as "joining apparatus") will be explained. For convenience in explanation, the punch side will be referred to as the "upper side", the die side as the "lower side", a punch side metal sheet as an "upper side metal sheet", and a die side metal sheet as a "lower side metal sheet", but the joining apparatus is only required to be fastened in place. Standing, lying flat, or positioned in another direction is not important.

Embodiment 1

Figure 1:
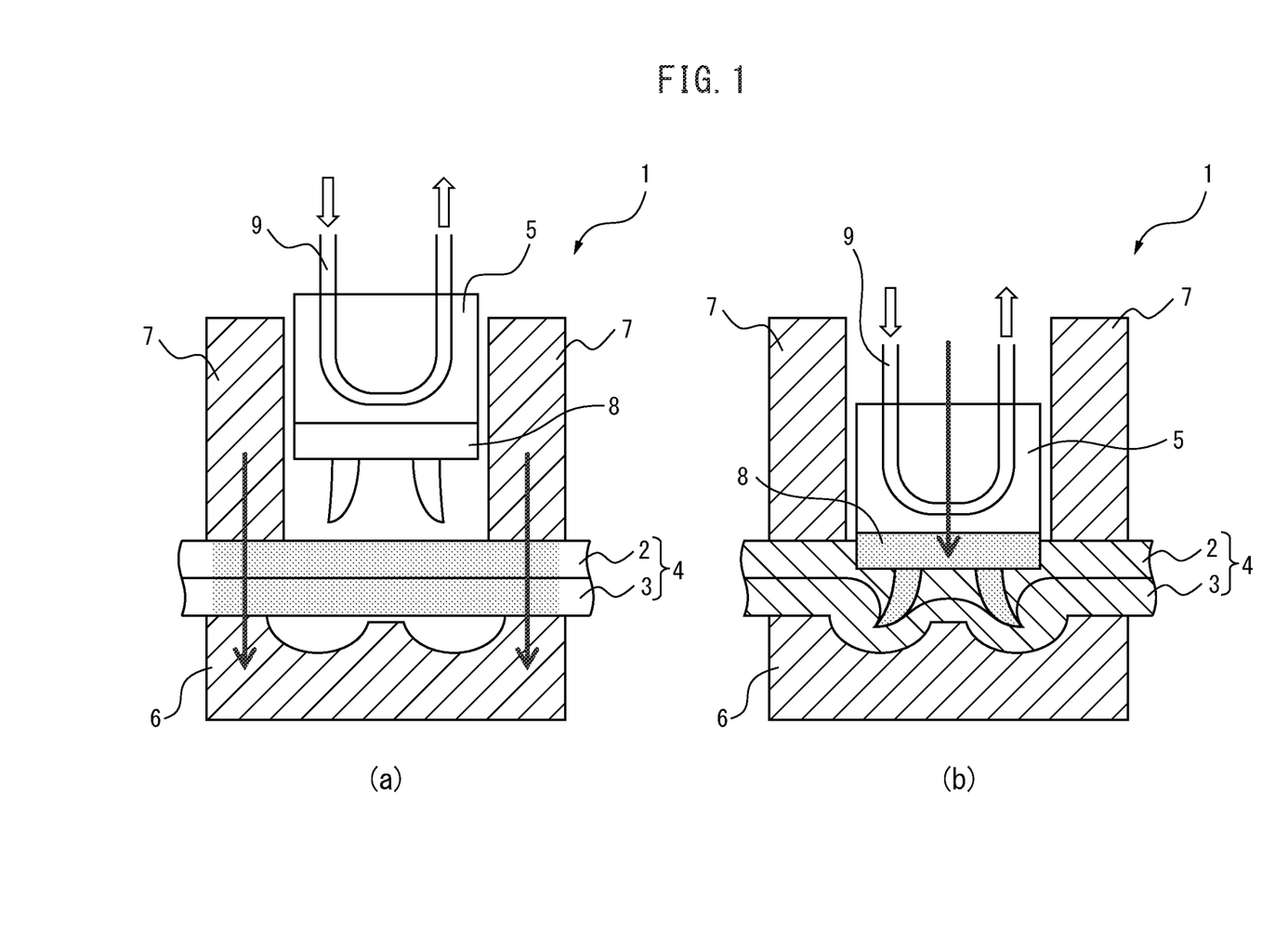
FIG. 1A is a cross-sectional schematic view showing the state of electrically heating a set of sheets before driving in a rivet.
FIG. 1B is a cross-sectional schematic view showing the state of electrically heating a rivet after driving in the rivet.

FIGS. 1A to 1B are cross-sectional schematic views showing modes of mechanical joining using the mechanical joining apparatus of the present disclosure. FIG. 1A is a cross-sectional schematic view showing the state of electrically heating a set of sheets before driving in a rivet, while FIG. 1B is a cross-sectional schematic view showing the state of electrically heating a rivet after driving in the rivet.

As shown in FIG. 1A, in the mechanical joining apparatus 1, a punch 5 and a die 6 are arranged facing each other so as to be able to sandwich a set of sheets 4 comprised of an upper side metal sheet 2 and a lower side metal sheet 3 stacked together between them. At the outer circumference of the punch 5, a blank holder 7 is arranged.

The mechanical joining apparatus 1 is provided with a first power device (not shown) supplying current between the blank holder 7 and the die 6 so as to raise the temperature of the set of sheets 4 before driving in a rivet 8 by the punch 5 and power device (not shown) supplying current between the punch 5 and the die 6 so that the rivet 8 driven in by the punch 5 is heat treated.

"Before driving in a rivet 8" means before a rivet 8 to be driven in by the punch 5 contacts the punch side metal sheet of the set of sheets 4.

By raising the temperature of the set of sheets 4 before driving in a rivet 8, the metal sheets soften and it becomes easy to drive in the rivet 8. In particular, it is possible to obtain a joint without fracture of the metal sheets, breakage of the rivet, and failure of rivet piercing even when the set of sheets 4 includes a 780 MPa or more high strength steel sheet.

The first power device is connected to the blank holder 7 and die 6 and is configured to electrically heat the set of sheets 4. The first power device may be provided with a first control device (not shown) controlling the amount of current (current value and application time) of the electric power supplied to the blank holder 7 and die 6 and can heat the set of sheets 4 to the desired temperature.

The first control device performs control to start to supply current to the blank holder 7 and die 6 to raise the temperature of the set of sheets 4 before the operation to drive in a rivet 8 and continues to supply current to the blank holder 7 and die 6 until the end of the operation to drive in the rivet 8 so as to electrically heat the set of sheets 4 to a predetermined temperature.

The electrical heating of the set of sheets 4 may be started before the operation for driving in a rivet 8, continue even after the end of the operation for driving in the rivet 8 stops, then stop, but preferably it stops substantially simultaneously with the end of the operation for driving in the rivet 8.

The "end of the operation for driving in a rivet 8" means the point of time when the punch substantially stops moving in the drive-in direction. It can be detected by detecting the position of the punch. The method of detecting the position of the punch is not particularly limited, but for example the position may be detected using a noncontact type laser displacement meter or a device detecting the position from the speed of a ball-screw pushing in the punch.

The heating temperature of the set of sheets 4 should be in a temperature range enabling the ductility of the set of sheets to be improved and suppressing fracture of the steel sheets or other metal sheets, breakage of the rivet, and failure of rivet piercing while enabling the rivet to be driven in. That is, the lower limit of the heating temperature of the set of sheets 4 should be made a temperature able to suppress fracture of the metal sheets, breakage of the rivet, and failure of rivet piercing The upper limit of the heating temperature of the set of sheets 4 should be made a temperature of less than the melting point of the metal sheet with the lowest melting point among the set of sheets 4.

The lower limit of the heating temperature of the set of sheets 4 is preferably 400° C. or more, more preferably 500° C. or more, still more preferably 600° C. or more. The upper limit of the heating temperature of the set of sheets is preferably 900° C. or less, more preferably 800° C. or less. The temperature may be lower than the above temperature range at the point of time of the start of the operation for driving in the rivet, but preferably the sheets are heated to the above temperature range before the end of the operation, more preferably the sets of sheets 4 is heated to the above temperature range before the start of the operation for driving in a rivet or at the point of time of the start of the operation and the temperature of the set of sheets 4 is maintained in the above temperature range until the end of the operation. The temperature of the set of sheets 4 is measured at the location where the rivet is driven in at the surface of the upper side metal sheet in a region surrounded by the blank holder 7. The surface temperature of the upper side metal sheet can for example by measured using a thermocouple. The surface temperature of the upper side metal sheet may also be measured in advance before preparing the rivet. If measuring the surface temperature of the upper side metal sheet in advance, the measurement of temperature when using the punch to hold the rivet and drive it in may be eliminated.

The value of the current for electrically heating the set of sheets 4 may be controlled by the first control device so as to heat the set of sheets 4 to within the above temperature range. The first control device can control the value of the current flowing through the set of sheets 4 to for example 8 to 14 kA or 10 to 12 kA.

The second power device is connected to the punch 5 and die 6 and is configured to supply current to the rivet 8 through the punch 5 and die 6 so as to heat treat it after the punch 5 drives in the rivet 8. The second power device may be provided with a second control device (not shown) controlling the amount of electric power supplied through the punch 5 and die 6 (current value and application time) so as to heat the rivet 8 to the desired temperature.

The mechanical joining apparatus 1 is provided with a cooling device (not shown). The cooling device is connected to the punch 5 and is configured to cool the rivet after heat treatment of the rivet through the punch 5.

The second power device and cooling device may be used to heat the rivet to the austenite region as heat treatment after the end of the operation for driving in the rivet 8 and then cool the same. Due to this, the rivet 8 can be given a martensite structure and the strength of the rivet 8 can be improved.

The heating temperature in the heat treatment of the rivet 8 is not particularly limited so long as one enabling the rivet 8 to be heated to the austenite region, but preferably the A3 point to a temperature of less than the melting point of the rivet is heated to. The current value and time in heating the rivet 8 to its highest temperature are for example a current value of 8 to 10 kA and a time of 0.1 to 1.0 sec.

The operation for electrically heating a rivet 8 may be started simultaneously with the end of the operation for driving in the rivet 8 or after the elapse of a predetermined time from the end of the operation for driving in the rivet 8. The second control device may control the second power device so as to electrically heat the rivet 8 simultaneously with the end of the operation for driving in the rivet 8 or after the elapse of a predetermined time from the end of the operation for driving in the rivet 8.

The cooling device is not particularly limited so long as one able to cool the rivet 8 through the punch 5, but the punch 5 may also have a cooling pipe 9 inside it. FIG. 1A shows a cooling pipe 9 arranged inside the punch 5 and connected to the cooling device.

The cooling pipe 9 is a pipe able to supply coolant in for example the direction shown by the arrows. A cooling device connected to the cooling pipe 9 at the other end side at the opposite side to the end of the punch 5 which the rivet 8 contacts can be provided. The cooling pipe 9 is not particularly limited in material so long as it can carry the coolant inside and cool the rivet through the punch 5, but for example it may be made of copper or a copper alloy. In this case, the punch 5 is preferably made copper or a copper alloy with a high heat conductivity.

The coolant is not particularly limited. A known liquid coolant or gaseous coolant may be used, but if considering economy and ease of handling etc., water is preferable.

It is also possible not to provide a cooling pipe 9 inside the punch 5 but to arrange the cooling device so as to contact the other end part at the opposite side to the end part of the punch 5 which the rivet 8 contacts and cool the punch 5 so as to cool the rivet 8 by heat conduction of the punch 5. In this case as well, the punch 5 is preferably made of copper or copper alloy with a high heat conductivity.

The cooling device is provided with a control device which can control the cooling temperature and cooling speed and the timing of the start and end of the cooling.

The cooling conditions after heating a rivet 8 to the austenite region are not particularly limited so long as a range in which a martensite structure is obtained, but the control device provided at the cooling device may control the cooling device so that after the rivet 8 is heated to the austenite region, the rivet 8 is preferably cooled by a 10° C./sec or more cooling speed down to the martensite transformation end temperature or less of the material forming the rivet, in general, down to about 200° C. or less.

The first power device and second power device are not particularly limited and may be power sources used in the past such as DC power devices or AC power devices.

The first control device, second control device, and control device provided at the cooling device are not particularly limited and may include known thermostats.

The first control device may use a thermostat including a thermometer for measuring the temperature of the set of sheets 4 so as to control the amount of current supplied through the blank holder 7 and die 6. The relationship between the current value and time giving a predetermined temperature corresponding to the combination of metal sheets of the set of sheets 4 may be found in advance and the first control device may control the first power device so as to obtain that current value and time.

The second control device may use a thermostat including a thermometer for measuring the temperature of a rivet 8 so as to control the amount of current supplied through the punch 5 and die 6. The relationship between the current value and time where the rivet 8 becomes a predetermined temperature may be found in advance and the second control device may control the second power device so as to obtain that current value and time.

The control device provided at the cooling device may use a thermostat to control the cooling speed and cooling temperature of the rivet 8.

The first power device and the second power device may be made separate power devices or an integrated power device or the first power device may also have the function of the second power device.

When the first power device and second power device are formed from an integrated power device or when the first power device also has the function of the second power device, that power device is connected to both of the blank holder 7 and die 6 and the punch 5 and die 6.

The punch 5 may be a rod shape. The cross-sectional shape in the direction vertical to the longitudinal direction of the punch 5 is not particularly limited and may be a circular shape, elliptical shape, rectangular shape, etc. The punch 5 may also have a cross-sectional shape different in the length direction.

The punch 5 is not particularly limited in its material so long as being comprised of an electrode material having a mechanical strength and electrical conductivity enabling it to drive a rivet 8 in and electrically heat it. It may be selected from materials having the desired mechanical strength. The punch 5 preferably has a Vickers hardness Hv of 300 to 510 and is comprised of copper or copper alloy with a high electrical conductivity.

The die 6 is not particularly limited in material so long as being comprised of an electrode material having a mechanical strength and electrical conductivity enabling it to support a plurality of metal sheets and electrically heat the set of sheets 4 and rivet 8. It may be selected from the desired materials. The die 6 is preferably copper or copper alloy.

At the outer circumference of the punch 5, the blank holder 7 is arranged. The blank holder 7 is a member which can contact the metal sheet at the punch 5 side of the set of sheets 4 at one end and press the set of sheets 4 against the die 6 and can move relatively to the punch 5 along its longitudinal axis. The blank holder 7 is shaped as a tubular member such as a tube into which the punch 4 is inserted.

The blank holder 7 is not particularly limited in material so long as it is made of an electrode material having mechanical strength and electrical conductivity enabling it to press a plurality of metal sheets against the die 6 and enabling it to electrical heat them. It may be selected from the desired materials. The blank holder 7 is preferably copper or copper alloy.

The copper alloy which can be used for the punch 5, die 6, blank holder 7, and cooling pipe 9 is preferably a chrome-copper alloy or alumina dispersed copper alloy. The composition of the chrome-copper alloy is preferably 0.4 to 1.6% Cr—Cu, more preferably 0.8 to 1.2% Cr—Cu, for example, 1.0% Cr—Cu, while the composition of the alumina dispersed copper alloy is preferably 0.2 to 1.0% $Al_2O_3$—Cu, more preferably 0.3 to 0.7% $Al_2O_3$—Cu, for example, 0.5% $Al_2O_3$—Cu.

A rivet 8 is placed at the front end of the punch 5. This rivet 8 is driven into the set of sheets 4 by the punch 5. A general use rivet may be used or a full tubular rivet etc. may be used. The material of the rivet 8 is not particularly limited so long as the rivet can be driven into the set of sheets 4 to enable joining and can become a martensite structure by heat treatment and cooling after being driven in, but for example may be steel for mechanical structures, high hardness steel, etc.

Before the driving operation, the rivet 8 can be arranged above the set of sheets 4 in a state supported by the punch 5 or a state supported by a suitable support member.

The method of supporting the punch 5 by the rivet 8 or a suitable support member is not particularly limited, but for example it may be held mechanically or the punch 5 and support member may be made materials having magnetism and the rivet 8 may be magnetically attached to them.

The die 6 arranged facing the punch 5 may also have a dish-shaped or recessed-shaped upsetting surface 12 corresponding to the shape and size of the leg part of the rivet 8 which is driven in and may have a substantially frustoconical shaped projecting part 13 at its center. The top part of the projecting part 13 may be made slightly lower than the top surface of the die 6. The base side of the projecting part 13 may have a smooth arc shaped surface connecting to the bottom surface of the upsetting surface 12.

The set of sheets 4 in which a rivet is to be driven using the apparatus of the present disclosure may be comprised of two sheets of the upper side metal sheet 2 and lower side metal sheet 3 or may contain a plurality of three or more metal sheets. The metal sheets need only be ones which have flat parts at least in part and have parts enabling the flat parts to be stacked with each other. They do not have to be flat parts overall. Further, the set of sheets 4 is not limited to one comprised of separate metal sheets. A single metal sheet may be formed into a tubular shape or other predetermined shape and stacked.

The plurality of metal sheets may be the same types of metal sheets or may be different types of metal sheets. The metal sheets may be made metal sheets having a high strength. Steel sheet, aluminum sheet, magnesium, etc. may be used. The steel sheet is preferably high strength steel sheet, more preferably high strength steel sheet having a 780 MPa or more tensile strength. The plurality of metal sheets may include one or more steel sheets or may include one or more high strength steel sheets having a 780 MPa or more tensile strength. For example, the set of sheets 4 may be made a set of sheets where all of the metal sheets of the set of sheets 4 are made steel sheets, a set of sheets where the upper side metal sheet or lower side metal sheet is made high strength steel sheet and the other metal sheets are made steel sheets with a tensile strength of less than 780 MPa, a set of sheets where the upper side metal sheet is made aluminum and the lower side metal sheet is made high strength steel sheet, or a set of sheets where the metal sheets of all of the set of sheets 4 are made aluminum sheets If using the apparatus of the present disclosure, it is possible to join well a set of sheets including at least one high strength steel sheet with a 780 MPa or more tensile strength.

The thickness of the metal sheets is not particularly limited. For example, it may be made 0.5 to 3.0 mm. Further, the thickness of the set of sheets is also not particularly limited. For example, it may be made 1.0 to 6.0 mm. Further, the presence of plating, the chemical composition, etc. are also not particularly limited.

FIGS. 1A and 1B illustrate the flow of current from the blank holder 7 toward the die 6 by the dot-chain lines, but it is sufficient that the set of sheets 4 be able to be electrically heated. It is also possible to make the current flow from the die 6 toward the blank holder 7. Further, the flow of current from the punch 5 toward the die 6 is illustrated by the solid line arrows, but it is sufficient that the rivet 8 can be electrically heated. The flow of current may also be made one from the die 6 toward the punch 5. The same is true in FIGS. 2A and 2B.

Embodiment 2

Referring to FIGS. 1A and 1B, the preferable embodiment of the Embodiment 2 will be explained.

The cooling device is preferably configured to cool a rivet through the punch 5 in the period from the start of the operation for driving in a rivet to the end of the operation. The set of sheets 4 is electrically heated while using the cooling device connected to the punch 5 to cool the rivet 8 while driving in the rivet 8 by the punch 5 to thereby join the set of sheets 4.

When electrically heating the set of sheets 4 between the blank holder 7 and the die 6 while driving in the rivet 8, by cooling the rivet 8 through the punch 5, it is possible to suppress softening of the rivet 8 due to the heat of the set of sheets 4 and possible to more stably perform the riveting. By cooling the rivet 8, even when in particular the temperature of the set of sheets 4 when driving in the rivet 8 is high, it is possible to keep the rivet 8 from softening and prevent failure of piercing of the rivet 8 and thereby enable more stable joining.

The rivet 8 may be cooled in the period from the start of the operation to drive in a rivet 8 to the end of the operation. That is, the rivet 8 may be cooled starting from before the operation for driving the rivet 8 in or may be started simultaneously with the start of the operation for driving it in, but preferably the rivet 8 starts to be cooled from before the operation for driving it in. The rivet 8 may finish being cooled simultaneously with the end of the operation for driving it in or may continue to be cooled even after the end of the operation for driving it in, but preferably it is ended substantially simultaneously with the end of the operation for driving it in.

A control device provided at the cooling device can control the cooling temperature and the timing of the start and end of the cooling. The control device controls the cooling device so that the temperature of the rivet 8 becomes preferably 3 to 50° C., more preferably 5 to 30° C., preferably at the time of the end of the operation for driving in the rivet, more preferably from the start of the operation for driving in the rivet to the end of the operation. The temperature of the rivet 8 may be found, for example, before actual joining, by conducting a preliminary test for measurement of the temperature of the rivet in advance and using a thermocouple to measure the temperature of the rivet.

The rivet 8 may continue being cooled through the punch 5 while heat treating the rivet 8, but preferably the amount of cooling of the cooling device is reduced, more preferably the cooling device is stopped.

Embodiment 3

Figure 2:
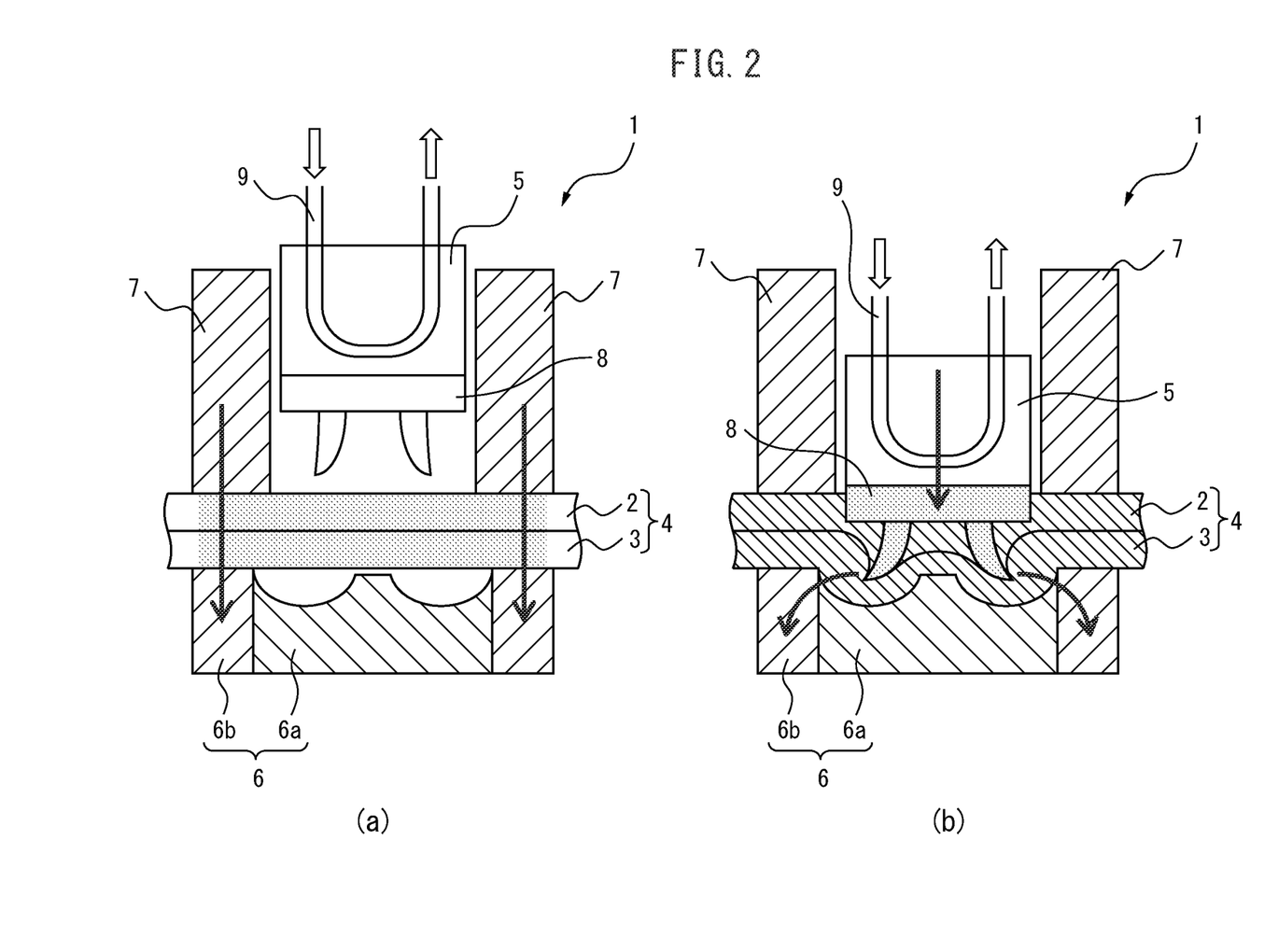
FIG. 2A is a cross-sectional schematic view showing the state when electrically heating a set of sheets before an operation to drive in a rivet when using tool steel for part of the die.
FIG. 2B is a cross-sectional schematic view showing the state when electrically heating a rivet after driving in the rivet when using tool steel for part of the die.

Referring to FIGS. 2A and 2B, the preferred embodiment of the Embodiment 3 will be explained. FIGS. 2A and 2B are cross-sectional schematic views showing the modes of mechanical joining using a mechanical joining apparatus provided with tool steel as part of the die. FIG. 2A is a cross-sectional schematic view showing the state of electrically heating a set of sheets before driving in a rivet when using tool steel for part of the die, while FIG. 2B is a cross-sectional schematic view showing the state of electrically heating a set of sheets after driving in a rivet when using tool steel for part of the die. The mechanical joining apparatus of FIGS. 2A and 2B has a configuration similar to the mechanical joining apparatus of FIGS. 1A and 1B except for the fact that the die 6 is comprised of a die made of tool steel 6a and a die made of copper or copper alloy 6b.

To suppress deformation of the die, in the die, it is effective to increase the strength of the part facing the rivet across the set of sheets 4 (part below part where rivet 8 is to be driven in). For this reason, as shown in FIGS. 2A and 2B, by making the part in the die 6 restraining the lower side metal sheet 3, which can deform due to the rivet 8 being driven in, a die 6a made of tool steel, it is possible to increase the strength of the die 6 and possible to suppress deformation of the die 6.

When driving a rivet into the set of sheets, if supplying current between the blank holder and the die or supplying current between the punch and die so as to heat treat the driven in rivet, the die is heated. At this time, if the die is made completely of tool steel, the die will easily soften. For this reason, preferably, the outer circumference part of the die 6a made of tool steel is comprised of copper or copper alloy from the viewpoint of facilitating the flow of current.

By placing the die 6b made of copper or copper alloy low in electrical resistance so as to surround the outer circumference of the die 6a made of tool steel, when supplying current between the blank holder 7 and the die 6 or supplying current between the punch 5 and the die 6, the current flows with priority to the outer circumference part with the low electrical resistance, so the die 6a made of tool steel becomes hard to heat and softening can be prevented.

When configuring part of the die 6 by tool steel, in the die 6, it is sufficient that at least the part facing the rivet 8 across the set of sheets 4 be comprised of tool steel, but just a portion of the part facing the blank holder 7 across the set of sheets 4 may also be comprised of tool steel. However, in the die 6, as the ratio of the part comprised of copper or copper alloy becomes smaller, current flows through the tool steel and the tool steel easily softens, so it is possible to adjust the ratio of the part comprised of the tool steel and the part comprised of copper or copper alloy in accordance with the amount of current flowing between the blank holder 7 and die 6 or between the punch 5 and die 6.

The present disclosure further covers a mechanical joining method using a punch to drive a rivet into a plurality of metal sheets, the mechanical joining method comprising preparing a plurality of metal sheets, placing the plurality of metal sheets stacked between a punch and die arranged facing each other, pushing one end of a blank holder comprised of a tubular member inside of which the punch can be inserted against a punch side metal sheet of the plurality of metal sheets, using the punch to drive a rivet into the plurality of metal sheets held by the blank holder, electrically heating the plurality of metal sheets through the blank holder and the die so as to raise the temperature of the plurality of metal sheets before driving in the rivet, and electrically heating the rivet through the punch and the die after using the punch to drive in the rivet, then cooling the rivet.

The joining method of the present disclosure will be explained while referring to FIGS. 1A and 1B.

A set of sheets 4 of a plurality of metal sheets is prepared. The set of sheets 4 may include at least one high strength steel sheet with a tensile strength of 780 MPa or more and may also include only metal sheets with tensile strengths of less than 780 MPa.

The set of sheets 4 is placed on the die 6, one end of a tubular member comprised of the blank holder 7 is pushed against the punch 5 side metal sheet of the set of sheets 4, and the punch 5 is used to drive in a rivet 8 into the set of sheets 4 pushed down by the blank holder 7.

To raise the temperature of the set of sheets 4 before the operation for driving in a rivet, the set of sheets 4 starts to be electrically heated through the blank holder 7 and die 6. The set of sheets 4 is electrically heated until the end of the operation for driving in the rivet 8.

After driving in the rivet, current is supplied to the rivet through the punch and die to heat it to a temperature becoming the austenite region, then the rivet is cooled to render it a martensite structure and make the rivet high in strength.

Preferably, in the period from the start of the operation for driving in a rivet 8 to the end of the operation, the rivet 8 is cooled through the punch 5.

Preferably, in the die, at least the part facing the rivet across the plurality of metal sheets is made of tool steel while the part at the outer circumference of the tool steel is made of copper or copper alloy.

For the configuration of the joining method of the present disclosure, it is possible to apply the configuration explained with reference to the mechanical joining apparatus.

EXAMPLES

Example 1

Using the mechanical joining apparatus 1 shown in FIGS. 1A and 1B, a set of sheets was mechanically joined using a rivet and the joint strength of the joint was tested.

A set of sheets 4 including, as a high strength steel sheet with a tensile strength of 780 MPa or more, a thickness 1.2 mm steel sheet with a 980 MPa tensile strength as an upper side metal sheet and, as a steel sheet with a tensile strength of less than 780 MPa, a thickness 1.6 mm steel sheet with a 440 MPa tensile strength as a lower side metal sheet was prepared.

As shown in FIG. 1A, the set of sheets 4 was placed on the copper die 6 then the steel blank holder 7 was used to push down the set of sheets 4 to make the sheets closely contact each other. A full tubular rivet made of high hardness steel and having a diameter of 6 mm was prepared and held at the punch 5.

10 kA current was supplied to the blank holder 7 and die 6 for 1 second using a first power device provided with a thermostat. When reaching 50° C., a 1.0% Cr—Cu punch 5 was used to drive in a rivet 8 for joining the sheets.

After the end of the driving operation, the rivet 8 stopped being cooled and the set of sheets 4 stopped being heated. 8 kA current was supplied through the punch 5 and die 6 using a second power device provided with a thermostat for 0.5 second to heat the rivet 8 to the austenite region of 900° C., then this was rapidly cooled by a 30° C./sec cooling rate down to 180° C. by a cooling device provided with a thermostat.

When the heat treated rivet was examined, it was confirmed that it had a martensite structure. Further, when conducting a joint strength test on the joint, it was learned that breakage in the rivet and area around it was decreased more compared with the case of not heat treating the rivet.

Example 2

Except for using a punch 5 provided inside it with a cooling pipe 9 connected to a cooling device provided with a thermostat and shown in FIGS. 1A and 1B to cool the rivet 8 through the punch 5 to 30° C. while driving in the rivet 8 by the punch 5 and for heating the set of sheets 4 to 780° C., a joining test was conducted under conditions similar to Example 1. The set of sheets could be joined without fracture of the metal sheets, breakage of the rivet, or failure of rivet piercing.

Example 3

Except for using the mechanical joining apparatus 1 shown in FIGS. 2A and 2B, making the part facing the rivet 8 across the set of sheets 4 a die 6a made of tool steel, and placing a copper die 6b at the outer circumference part of the die 6a, a joining test was conducted under conditions similar to Example 1. It was possible to suppress deformation of the die 6 and the set of sheets could be joined without fracture of the metal sheets, breakage of the rivet, or failure of rivet piercing.

REFERENCE SIGNS LIST 1. mechanical joining apparatus
2. upper side metal sheet
3. lower side metal sheet
4. set of sheets
5. punch
5a. large diameter part of punch
5b. small diameter part of punch
6. die
6a. die made of tool steel
6b. die made of copper or copper alloy
7. blank holder
8. rivet
9. cooling pipe
10. through hole
11. insulating layer
12. upsetting surface
13. projecting part
14. movable plate
15. holder
16. compression coil spring
17. holding plate
18. plastic member
19. guide bolt

The invention claimed is:

1. A mechanical joining apparatus using a punch to drive a rivet into a plurality of metal sheets, the mechanical joining apparatus comprising
    a punch and die,
    a blank holder,
    a first power device,
    a second power device, and
    a cooling device, wherein
    the punch and die are arranged facing each other so as to enable the punch and die to sandwich a superposed plurality of metal sheets between the punch and die,
    the blank holder is a tubular member inside of which the punch can be inserted and is configured by an electrode material able to push against the plurality of metal sheets and able to electrically heat the plurality of metal sheets by one end of the blank holder being made to contact a punch side metal sheet of the plurality of metal sheets,
    the punch is comprised of a material able to drive in a rivet and able to electrically heat the rivet,
    the die is comprised of an electrode material able to support the plurality of metal sheets and able to electrically heat the rivet, the first power device is configured to start supply of current through the blank holder and the die so as to raise the temperature of the plurality of metal sheets before the punch drives in the rivet, the second power device is configured to start supply of current through the punch and the die so as to supply current through and heat treat the rivet after the punch drives in the rivet, and the cooling device is connected to the punch and is configured to cool the rivet after the rivet is heat treated, wherein in the die, at least a part facing the rivet across the plurality of metal sheets is made of tool steel and a part at the outer circumference of the tool steel is made of copper or copper alloy.

2. The mechanical joining apparatus according to claim 1, wherein the cooling device is configured to cool the rivet in a period from the start of the driving in of the rivet to the end of the driving in of the rivet.

3. A mechanical joining method using a punch to drive a rivet into a plurality of metal sheets, the mechanical joining method comprising preparing a plurality of metal sheets, placing the plurality of metal sheets stacked between a punch and die arranged facing each other, pushing one end of a blank holder comprised of a tubular member inside of which the punch can be inserted against a punch side metal sheet of the plurality of metal sheets, using the punch to drive a rivet into the plurality of metal sheets held by the blank holder, electrically heating the plurality of metal sheets through the blank holder and the die so as to raise the temperature of the plurality of metal sheets before driving in the rivet, and electrically heating the rivet through the punch and the die after using the punch to drive in the rivet, then cooling the rivet, wherein the method further comprising cooling the rivet through the punch in a period from the start of the driving in of the rivet until the end of the driving in of the rivet.

4. A mechanical joining method using a punch to drive a rivet into a plurality of metal sheets, the mechanical joining method comprising preparing a plurality of metal sheets, placing the plurality of metal sheets stacked between a punch and die arranged facing each other, pushing one end of a blank holder comprised of a tubular member inside of which the punch can be inserted against a punch side metal sheet of the plurality of metal sheets, using the punch to drive a rivet into the plurality of metal sheets held by the blank holder, electrically heating the plurality of metal sheets through the blank holder and the die so as to raise the temperature of the plurality of metal sheets before driving in the rivet, and electrically heating the rivet through the punch and the die after using the punch to drive in the rivet, then cooling the rivet, wherein in the die, at least a part facing the rivet across the plurality of metal sheets is made of tool steel and a part at the outer circumferences of the tool steel is made of copper or copper alloy.

5. The mechanical joining method according to claim 3, wherein in the die, at least a part facing the rivet across the plurality of metal sheets is made of tool steel and a part at the outer circumferences of the tool steel is made of copper or copper alloy.

* * * * *